June 1, 1937.    J. S. PARSONS    2,082,024
THERMALLY PROTECTED NETWORK UNIT
Filed Jan. 2, 1935

WITNESSES:
C. J. Weller
G. O. Harrison

INVENTOR
John S. Parsons.
BY
Waltman
ATTORNEY

Patented June 1, 1937

2,082,024

UNITED STATES PATENT OFFICE 2,082,024

THERMALLY PROTECTED NETWORK UNIT

John S. Parsons, Swissvale, Pa., assignor to Westinghouse Electric & Manufacturing Company, East Pittsburgh, Pa., a corporation of Pennsylvania Application January 2, 1935, Serial No. 93

10 Claims. (Cl. 175—294)

My invention relates to electrical protective apparatus and particularly to thermal relays and trip devices for use in the protection of distribution transformers. Although not limited thereto, my invention is particularly applicable to the protection of distribution transformers connected in parallel on both the high-voltage and low-voltage sides and provided with individual switching devices as used, for example, in banked transformer arrangements and in network distribution systems.

In low-voltage network systems, it is the practice to trip the network protectors only in the event of a primary fault, and to burn off all faults on the secondary grid. It occasionally happens that secondary faults occur which do not clear themselves, because of an insufficient supply of current to the fault. This condition is more likely to occur on overhead secondary network systems than on underground systems, because the network transformers are located farther apart or are of smaller capacity, and the impedance of the secondary mains is considerably higher.

When secondary faults fail to clear within a reasonable time or fail to clear entirely and have to be cut clear, there is danger that certain of the network transformers through which the fault current is supplied will be damaged because of overheating. It is desirable to keep all network protectors closed on a secondary fault, thus supplying as much current to the fault as possible. If the fault has not cleared, however, before one or more of the transformers approaches a dangerous temperature which would render it unfit for further service, it is desirable to trip the network protector and save the transformer.

I propose to provide a thermal relay or trip device for the network protector or other circuit breaker associated with the transformer, designed to trip the breaker with a variable time delay dependent upon a load variable and the thermal characteristics of the transformer. The minimum time delay for such tripping should be of the order of two to three seconds in order to permit the majority of network faults to burn off in the usual manner. However, in the event of sustained secondary faults which fail to clear within the variable time limit of the thermal device, the overload transformers are disconnected individually before any of them are permanently damaged.

It is accordingly an object of my invention to provide a novel thermally protected network unit comprising a transformer and network protector for use in a bank connection or in a network distribution system.

Other objects of my invention will become evident from the following detailed description of my invention taken in conjunction with the accompanying drawing in which.

Figure 1:
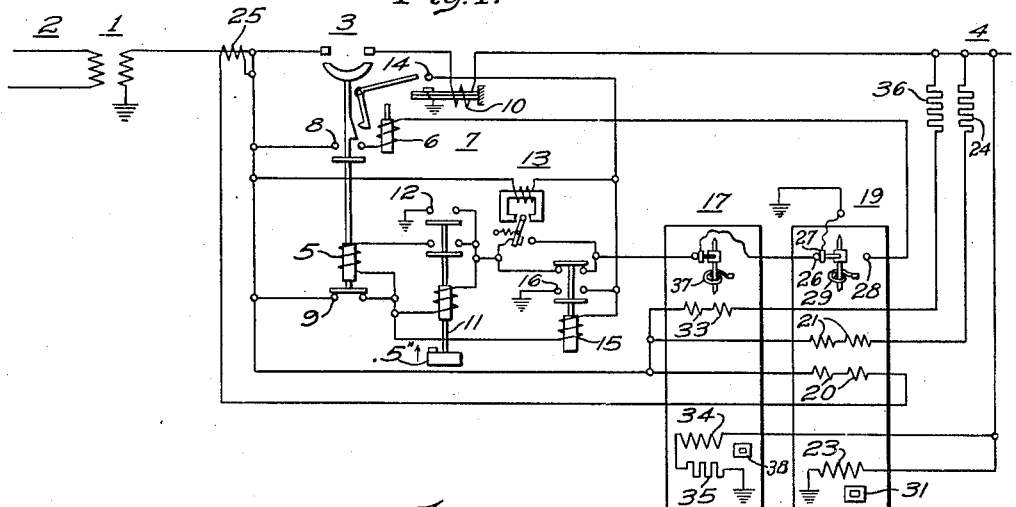
Figure 1 is a diagrammatic view of a network unit embodying my invention.

Referring to Fig. 1 in detail, a network transformer 1 has a primary winding connected to a medium voltage feeder 2 and its low voltage windings arranged to be connected by means of a circuit breaker 3 to a network distribution circuit 4. It will be understood that the network circuit 4 is supplied by means of a plurality of feeders (not shown) similar to the feeder 2, and that each feeder is connected to the network circuit 4 by means of a plurality of transformers and network protectors in the usual manner.

The circuit breaker 3 may be of any suitable type, of which there are many forms known in the art. In the form shown, the circuit breaker 3 is provided with a suitable electromagnetic closing element, such as a solenoid 5, an electromagnetic trip coil 6, and auxiliary front and back contacts 8 and 9 respectively.

In accordance with my invention, the circuit breaker 3 is provided with a thermal trip device 7 arranged to directly operate the circuit breaker latch and to complete a control circuit in the event of a continued overcurrent condition. The thermal trip device 7 comprises a suitable thermo-mechanical element such as a bimetal strip, heated by means of a coil 10 directly from the main circuit. Such a thermal device has an inverse time-current characteristic, similar in general form to the maximum safe current curve of a transformer, as plotted with respect to time. I prefer to design the trip device so that it will trip the circuit breaker 3 with a variable time delay slightly less than the maximum safe time during which the transformer 1 may remain connected, for loads within the range of approximately 150% rated transformer capacity to 20 times rated capacity. The thermal trip device 7 is also provided with front contacts 14 arranged to complete a control circuit when the device operates.

The closing solenoid 5 of the circuit breaker 3 is controlled by means of a contactor 11 having a time delay of the order of .5 second in its closing operation. The contactor 11 is provided with front contacts 12 for establishing a holding circuit for itself upon its closure, and is arranged to be energized by means of a closing circuit which includes the back contacts 9 of the circuit breaker 3; front contacts of a timing relay 13 and back contacts of a contactor 15 in parallel; and the closing contacts of a phasing relay 17 and a directional network relay 19.

The timing relay 13 may be of any suitable type for operating with comparatively long time delay such as three to fifteen minutes, and will be assumed to be a geared synchronous-motor driven timer adjusted to close its contacts 10 minutes after energization of its coil. The contactor 15 is preferably of instantaneous operating type and is provided with contacts 16 for establishing a holding circuit for itself upon its closure, in the same manner as closing contactor 11.

The network relay 19 is preferably of the usual induction disc construction and is provided with a pair of current windings 20, a pair of phasing windings 21, and a potential winding 23. The current windings 20 are energized in accordance with the line current by means of a current transformer 25. The phasing windings 21 are connected across the break contacts of the circuit breaker 3, in series with a suitable phasing resistor 24, in the usual manner. The potential winding 23 is connected between the network 4 and ground in the usual manner.

The network relay 19 is provided with a movable contact 27, arranged to engage either a stationary closing contact 26 or a stationary tripping contact 28, or to stand in a neutral position, depending upon the direction and magnitude of relay torque. A biasing spring 29 is provided for maintaining the movable contact 27 in engagement with the closing contact 26 when the relay is deenergized. An overvoltage adjuster 31 is provided for overcoming the bias of the spring 29 and rotating the contact 27 out of engagement with the closing contact 26 when the network is energized, in a manner well understood in the art.

The network relay 19 is designed and connected to trip open the circuit breaker 3 in the event of reverse power flow exceeding a predetermined small value, such as 1% of the rated capacity of the transformer 1. With such an adjustment, the network relay 19 operates in the event of a fault on the feeder 2 and also in the event of the disconnection of the feeder 2 from its source, because of the transformer magnetizing losses supplied to the transformer winding from the network 4 in reverse direction. The network relay 19 also cooperates with the phasing relay 17 in controlling the closure of the network circuit breaker 3, as will be explained below.

The phasing relay 17 is provided with the usual phasing windings 3 in cooperative relationship with a potential winding 34. The potential winding 34 is connected between the network 4 and ground in series with a resistor 35 for securing a rotated closing characteristic in the usual manner. The phasing windings 33 are connected across the break contacts of circuit breaker 3, in series with a suitable phasing resistor 36. A biasing spring 37 is provided for maintaining the contacts of the phasing relay 17 closed, and an overvoltage adjuster 38 is provided for overcoming the bias of the spring 37 when the network is energized.

As mentioned above, the network relay 19 and phasing relay 17 are designed and connected to cooperate in the closing operation of the circuit breaker 3. The network relay 19 is designed in the usual manner so that engagement of its movable contact 27 with its closing contact 26 occurs when the voltage on the feeder side of the circuit breaker 3 exceeds the voltage of network 4 by a small amount, such as ½ volt, and is substantially in phase with the network voltage. The ½ volt overvoltage figure is mentioned by way of example only, as this value may be adjusted by the overvoltage adjuster 31. The phasing relay 17 is designed with a similar closing characteristic to the network relay 19 except that its characteristic is rotated through a comparatively large angle such as 85° in the leading direction. Within reasonable limits of voltage, the closing characteristics of the relays 17 and 19 are straight lines which intersect at almost right angles, and closure of the circuit breaker 3 occurs when the voltage across its break contacts terminates approximately, within the upper left quadrant, the phase position of network voltage being taken as reference.

The operation of the apparatus shown in Fig. 1 may be set forth as follows: It is assumed that initially feeder 2 and the network 4 are deenergized, and the circuit breaker 3 and various relays are in the position shown. If the feeder 2 becomes energized, a circuit for the closing contactor 11 is established from the secondary winding of transformer 1, through the back contacts 9 of circuit breaker 3, the coil of closing contactor 11, back contacts of contactor 15, the contacts of phasing relay 17, and contacts 26 and 27 of the network relay 19 to ground. Upon completion of this circuit, the closing contactor 11 closes with a time delay of .5 second to establish a holding circuit for itself through its front contacts 12 and to energize the closing solenoid 5 of the circuit breaker 3. The circuit breaker 3 accordingly closes, and power is supplied from the transformer 1 to any translating devices connected to the network 4.

If a fault occurs on the network 4, the direction of power flow remains from left to right in the figure, and the movable contact 27 of the network relay 19 remains in the position shown. The fault is burned off in the usual manner. As the reactance of the transformer 1 is of the order of 5% to 10%, the fault current which traverses the circuit breaker 3 is of the order of ten to twenty times the rated full load current of the transformer 1. As this current is many times larger than the minimum value of 150% transformer capacity to which the thermal device 7 responds, an operation of the latter will occur if the fault persists for any length of time.

If the fault burns off within the usual time limits of from one cycle to one-half second, the heating effect of the heating coil 10 diminishes to approximately normal, and no action of the thermal device 7 occurs. However, if the fault on the network 4 fails to clear, the heating action of the coil 10 continues, and at the expiration of a variable time interval, dependent upon the magnitude of the fault current and the characteristics of the transformer 1, the thermal device 7 operates to trip open the circuit breaker 3 and to effect engagement of its contacts 14.

Upon the opening of circuit breaker 3, a circuit may be established for the closing contactor 11, depending upon the adjustment of the phasing relay 17. However, as the closing contactor 11 has a time delay of the order of .5 second, it does not immediately close. The operation of the thermal device 7 causes energization of the timing relay 13 and also of the contactor 15. The contactor 15 accordingly closes to establish a holding circuit for itself through its front contacts 16, and to interrupt the closing circuit for the closing contactor 11 by means of its back contacts.

As the contactor 15 is locked in closed position, the closing contactor 11 cannot be immediately reclosed, regardless of the condition of the phasing relay 17 and the network relay 19. At the expiration of the ten minute time interval of the timing relay 13, the latter closes to again permit closure of the circuit breaker 3, in the event that the condition of the phasing relay 17 and the network relay 19 are suitable for closure.

As the feeder 2, and network 4 are now both energized, the phasing relay 17 and the network relay 19 operate in the usual manner to compare the magnitudes and phase relationship of voltages on the feeder and network sides of the circuit breaker 3. When the voltage on the feeder side exceeds the voltage on the network side by a small value such as one-half volt, and falls within the closing area determined by the characteristics of the relays 17 and 19, the circuit breaker 3 is reclosed in the usual manner.

If a fault occurs on the feeder, the direction of power flow reverses, and the network relay 19 operates to complete an energizing circuit for the trip coil 6 of the circuit breaker 3. The circuit breaker 3 accordingly trips open in the usual manner.

Figure 2:
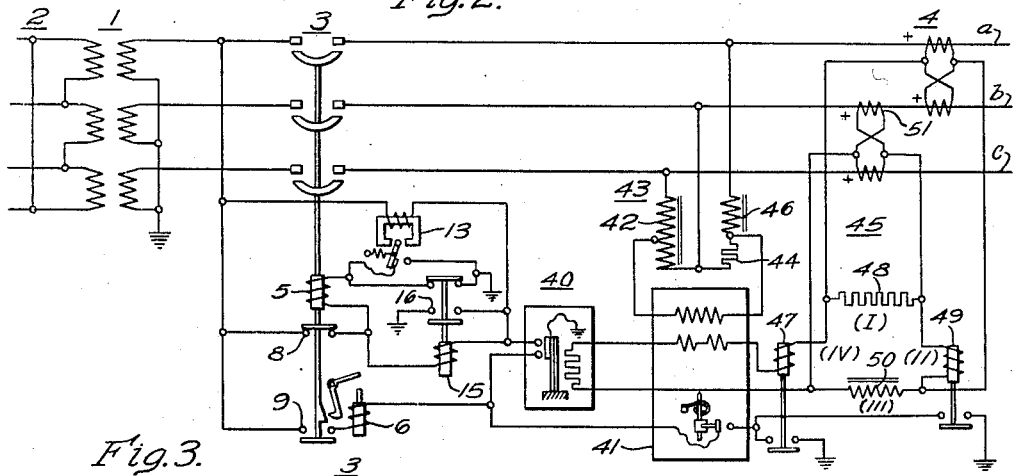
Fig. 2 is a diagrammatic view of a network unit in which the network protector is arranged to be reclosed when the feeder circuit from which it is supplied is energized to a predetermined degree, regardless of the phase relationship of feeder and network voltages.

Referring to Fig. 2, which shows one application of my invention to polyphase network apparatus, a bank of transformers 1, corresponding to the transformer 1 of Fig. 1, is connected in delta on its high side to a feeder 2, and has its low-voltage windings connected in star with neutral grounded. The low-voltage windings of transformer bank 1 are arranged to be connected to the network 4 by means of a polyphase circuit breaker 3.

The operating elements of the circuit breaker 3 are similar to the corresponding elements of the circuit breaker shown in Fig. 1, except that the thermal trip device 7 is omitted.

In the Fig. 2 modification, a timing relay 13 and contactor 15, similar to the corresponding elements of Fig. 1 are provided for the same purposes as in Fig. 1. However, the closing contactor 11 of Fig. 1 is omitted and the closing solenoid 5 is energized directly from the line. The solenoid 5 is designed to close the circuit breaker 3 in response to line voltage of a predetermined value such as 95% normal. The circuit breaker 3 is not designed for high-speed or instantaneous reclosure, and, because of the mass of its parts, is appreciably slower in closing than an instantaneous relay such as the contactor 15.

A thermal relay 40 is provided as a substitute for the thermal device 7 of Fig. 1 and is connected to energize the trip coil 6, the timing relay 13 and the contactor 15, upon operation. The thermal relay 40 preferably has the same time-current characteristics as the thermal trip device 7 of Fig. 1 and may be regarded as equivalent thereto.

In place of the network relay 19 of Fig. 1, the arrangement of Fig. 2 is provided with a single-element power directional relay 41 energized by means of a positive phase sequence voltage filter 43 and a phase-sequence current filter 45 in accordance with the positive sequence power flow through the circuit breaker 3. The relay 41 is biased to open position by any suitable means and is adjusted to close in response to reverse positive sequence power flow of comparatively small value such as 1% of the rated volt-ampere capacity of the transformer bank 1.

In order to prevent unnecessary operations of the circuit breaker 3 under normal reverse power conditions, a positive sequence overcurrent relay 47 and a negative sequence overcurrent relay 49 are provided. The positive sequence overcurrent relay 47 is designed to close at a comparatively large current value, such as the positive sequence current corresponding to a balanced load of 100% rated capacity of the transformer bank 1. The negative sequence overcurrent relay 49 is designed to close at a current value of the order of 20% of that necessary to effect closure of the positive sequence overcurrent relay 47. The contacts of the overcurrent relays 47 and 49 are connected in parallel to each other and in series to the contacts of the direction relay 41 and the trip coil 6, so that the circuit breaker 3 is tripped in response to reverse power flow if the positive sequence current exceeds 100% rated capacity or the negative sequence current exceeds 20% rated capacity.

The feeder 2 may be provided with a suitable negative sequence source such as a single-phase load, a single phase grounding switch or any equivalent device for loading back the feeder 2 when the feeder circuit breaker (not shown) is open, in order to produce the 20% value of negative sequence current necessary to cause the network protectors to open. As such load-back apparatus per se, forms no part of the present invention, it has not been illustrated.

The voltage phase sequence filter 43 is preferably of the type disclosed in United States Patent to B. E. Lenehan, No. 1,936,797, issued November 28, 1933 and assigned to the Westinghouse Electric & Manufacturing Company. This filter consists of an auto-transformer 42 having a tap to provide a voltage less than half the voltage impressed upon the auto-transformer, for example a 40% tap, a resistor 44 and a reactor 46.

The constants of the filter 43 are so related that the voltage drop across the resistor 44 is equal to the same percentage of the total voltage impressed on the resistor 44 and reactor 46 in series, as the ratio of the auto-transformer 42 but lags the total voltage impressed on the resistor and the reactor by a phase angle of 60°. Assuming that the phase sequence of voltage of the phase distribution 4 is indicated by the subscript $a$, $b$, $c$ of the network conductors, the voltage applied to the potential winding of the relay 41 is proportional to the positive symmetrical components of network voltage.

The current phase sequence filter 45 consists of a Wheatstone bridge, through the diagonal junctions of which currents proportional to the sum of $a$-phase line current and $c$-phase line current reversed, and the sum of $b$-phase line current and $c$-phase line current reversed, respectively, are circulated by means of suitable current transformers 51. The four branches of the Wheatstone bridge are composed of (I) the resistor 48; (II) the coil of negative sequence relay 49; (III) the reactor 50; and (IV) the coil of positive sequence relay 47, the current coils of directional relay 41 and the heating coil of thermal relay 40, in series. The impedance relationships are as follows: The impedance of branch (II) is equal in magnitude and phase angle to the impedance of branch (IV). The impedance of branches (III) and (IV) in series is equal to the impedance of branches (I) and (IV) in series, rotated through a phase angle of 60° in the positive or leading direction.

The operation of the protector shown in Fig. 2 may be set forth as follows: Upon energization of the feeder 2 at a voltage above 95% normal, the circuit breaker 3 closes without comparison of voltages if the contactor 15 is deenergized. Reverse-power tripping occurs when the direction of positive sequence power is reversed and either positive sequence current exceeds the 100% value referred to above, or negative sequence current exceeds the 20% value. The 100% value would be occasioned by a feeder fault, and the 20% value would be caused by either an unsymmetrical feeder fault or an artifically established load-back condition, as mentioned above.

Tripping in response to a secondary or network fault occurs only when the thermal relay 40 has been subjected to prolonged energization at overload currents, as would be the case in the event of failure of a network fault to clear. Upon tripping of the circuit breaker 3 in response to a secondary fault, the timing relay 13 is set into operation as in Fig. 1, and reestablishes a closing circuit after a time interval sufficient to permit cooling of the transformer bank 1, for example, of the order of 10 minutes.

The timing relay 13 is provided in the arrangements of Figs. 1 and 2 in order to secure a time interval commensurate with the cooling time of a transformer, as thermal devices such as 7 and 40 would ordinarily cool much more rapidly than a distribution transformer. In order to permit the thermal device to be used to time the cooling operation of the transformer, and thereby omit the timing relay 13, a somewhat different form of thermal device may be provided as shown in Fig. 3.

Figure 3:
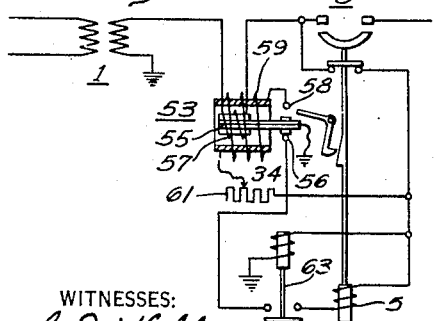
Fig. 3 is a diagrammatic view of a thermally controlled circuit breaker embodying my invention.

Referring to Fig. 3 the thermal device 53 comprises a bimetal element 55 having a series heating coil 57 and a shunt heating coil 59 arranged to thermally affect the element 55. The bimetal element 55 is provided with normally closed back contacts 56, and is arranged to close front contacts 58 and to trip open the circuit breaker 3 in response to a sufficient rise in its temperature. The front contacts 58 are arranged to connect the shunt heating coil 59, in series with a resistor 61, to ground.

An auxiliary relay 63 is provided for completing a circuit for the closing solenoid 5 when the line to ground voltage is of proper magnitude.

The operation of the apparatus shown in Fig. 3 may be set forth as follows: When the circuit breaker 3 is closed, the bimetal element 55 is heated by the series coil 57 only. If the load current is sufficiently great and is maintained for a sufficient interval of time, the bimetal element 55 operates to trip open the circuit breaker 3 and to complete a circuit for the shunt heating coil 59. In response to energization of the shunt heating coil 59, a constant heating effect is applied to the bimetal element 55 which prevents rapid cooling of the latter and prolongs the time required for it to reach a reset temperature.

Figure 4:
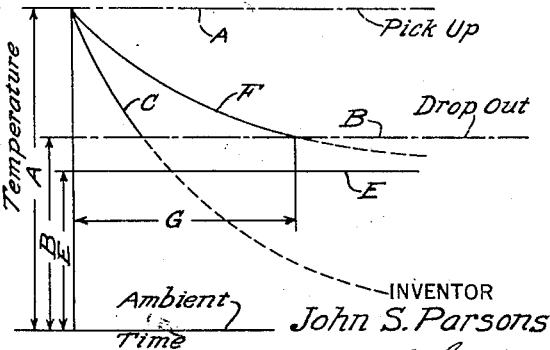
Fig. 4 is a diagram in Cartesian coordinates showing the relationship of temperature and time necessary to effect operation of the thermal device shown in Fig. 3.

The operating characteristics of the device shown in Fig. 3 may be better understood by referring to Fig. 4. In Fig. 4 the ordinate A represents the operating temperature of the thermal element 55, and the ordinate B its reset temperature. Both ordinates A and B are referred to the ambient temperature which corresponds to zero or the x-axis. If the bimetal element 55 were allowed to cool without any auxiliary heating, it would approach ambient temperature along an exponential curve such as the curve C, and operation of the thermal relay would occur at a time corresponding to the intersection of the curve C and the horizontal line corresponding to the ordinate B.

However, because of the shunt heating coil 59, the temperature of the bimetal element 55 does not approach ambient temperature, but approaches a higher temperature level denoted by the ordinate E, along an exponential curve such as F. With such a relationship of variables, the time required for the temperature of the bimetal element to attain its operating value B is greatly prolonged as indicated by the abscissa G.

Although in Figs. 1 and 3 I have shown my invention in connection with single phase apparatus, it will be understood that it is equally applicable to polyphase systems and apparatus as shown in Fig. 2.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. A network unit for supplying power from an alternating-current feeder circuit to an alternating-current network circuit comprising a transformer, a circuit breaker for controlling the flow of power through said transformer, and control means for said circuit breaker including thermal means responsive to a variable condition dependent upon the load on said transformer for causing said circuit breaker to open, fault-responsive means for causing said circuit breaker to open, reclosing means responsive to a predetermined normal condition involving energization of said feeder circuit, and means effective when said circuit breaker is open for selectively delaying operation of said reclosing means depending upon whether the previous opening operation of said circuit breaker was effected by said thermal means or said fault-responsive means.

2. A network unit for supplying power from an alternating-current feeder circuit to an alternating-current network circuit comprising a transformer, a circuit breaker for controlling the flow of power through said transformer, and control means for said circuit breaker including thermal means responsive to a variable condition dependent upon the load on said transformer for causing said circuit breaker to open, fault-responsive means for causing said circuit breaker to open, reclosing means responsive to a predetermined normal condition involving energization of said feeder circuit, and means responsive to operation of said thermal means for delaying operation of said reclosing means for a comparatively long time interval to permit cooling of said transformer.

3. A network unit for supplying power from an alternating-current feeder circuit to a low-voltage alternating-current network circuit comprising a transformer, a circuit breaker for controlling the flow of power through said transformer, and control means for said circuit breaker including thermal means responsive to a variable condition dependent upon the load on said transformer for causing said circuit breaker to open after a time delay greater than the time usually required for burning off a short-circuit on said network circuit, and means responsive to a fault on said feeder circuit for causing said circuit breaker to open within a comparatively short time interval, said control means being effective to maintain said circuit breaker closed during a short-circuit on said network circuit.

4. A network unit for supplying power from an alternating-current feeder circuit to a low-voltage alternating-current network circuit comprising a transformer, a circuit breaker for controlling the flow of power through said transformer, time-element overcurrent means responsive to a current condition of said transformer for causing said circuit breaker to open after a minimum time delay greater than the time usually required for burning off a short-circuit on said network circuit, and means responsive to a fault on said feeder circuit for causing said circuit breaker to open within a comparatively short time interval, said last-mentioned means being ineffective to cause said circuit breaker to open in response to a short-circuit on said network circuit.

5. A network unit for supplying power from an alternating-current feeder circuit to a low-voltage alternating-current network circuit comprising a transformer, a circuit breaker for controlling the flow of power through said transformer, time-element overcurrent means responsive to a current condition of said transformer for causing said circuit breaker to open after a minimum time delay greater than the time ordinarily required for burning off a fault on said network circuit, and directional means responsive to predetermined abnormal conditions involving power flow from said net-work circuit to said feeder circuit for causing said circuit breaker to open within a comparatively short time interval.

6. A network unit for supplying power from an alternating-current feeder circuit to an alternating-current network circuit comprising a transformer, a circuit breaker for controlling the flow of power through said transformer, and control means for said circuit breaker including closing means responsive to a predetermined normal condition involving energization of said feeder circuit, said closing means including a closing circuit, thermal means responsive to a variable condition dependent upon the load on said transformer for causing said circuit breaker to open, means responsive to operation of said thermal means for opening said closing circuit, and means for preventing completion of said closing circuit until said transformer has cooled.

7. A network unit for supplying power from an alternating-current feeder circuit to an alternating-current network circuit comprising a transformer, a circuit breaker for controlling the flow of power through said transformer, and control means for said circuit breaker including closing means responsive to a predetermined normal condition involving energization of said feeder circuit, said closing means including a closing circuit, thermal means responsive to a variable condition dependent upon the load on said transformer for causing said circuit breaker to open, switch means responsive to operation of said thermal means for opening said closing circuit, and a relay for establishing a shunt around said switch means after said transformer has cooled.

8. The combination of claim 7 in which the relay is a time-element relay.

9. A network unit for supplying power from an alternating-current feeder circuit to an alternating-current network circuit comprising a transformer, a circuit breaker for controlling the flow of power through said transformer, and control means for said circuit breaker including closing means responsive to a predetermined normal condition involving energization of said feeder circuit, said closing means including a closing circuit, thermal means responsive to a variable condition dependent upon the load on said transformer for causing said circuit breaker to open, switch means responsive to operation of said thermal means for opening said closing circuit, said switch means including sealing means for maintaining itself in actuated condition regardless of the condition of said thermal means, and a time-element relay for establishing a shunt around said switch means.

10. A network unit for supplying power from an alternating-current feeder circuit to an alternating-current network circuit comprising a transformer, a circuit breaker for controlling the flow of power through said transformer, and control means for said circuit breaker including thermally responsive means effective when subject to a predetermined temperature to cause said circuit breaker to open and effective when subject to a predetermined lower temperature to cause said circuit breaker to close, means effective when said circuit breaker is closed for heating said thermally responsive means in accordance with a current condition of said transformer and means effective when said circuit breaker is open for heating said thermally responsive means at a comparatively low rate such as to delay the attainment of said predetermined lower temperature for a relatively long time interval and then permit the attainment thereof.

JOHN S. PARSONS.